United States Patent [19]

Kamiyama

[11] Patent Number: 5,072,969

[45] Date of Patent: Dec. 17, 1991

[54] SHOULDER BELT ADJUSTING APPARATUS OF A SEAT BELT

[75] Inventor: Misao Kamiyama, Shiga, Japan

[73] Assignee: Takata Corporation, Tokyo, Japan

[21] Appl. No.: 565,577

[22] Filed: Aug. 10, 1990

[30] Foreign Application Priority Data

Sep. 12, 1989 [JP] Japan .................................. 1-235957

[51] Int. Cl.⁵ ............................................ B60R 22/00
[52] U.S. Cl. .................................... 280/808; 280/801
[58] Field of Search ................................ 280/801, 808

[56] References Cited

U.S. PATENT DOCUMENTS

| | | | |
|---|---|---|---|
| 4,547,717 | 10/1985 | Radermacher et al. | 318/484 |
| 4,706,993 | 11/1987 | Tamura | 280/808 |
| 4,801,156 | 1/1989 | Escaravage | 280/808 |
| 4,892,331 | 1/1990 | Wollner et al. | 280/808 |

FOREIGN PATENT DOCUMENTS

| | | |
|---|---|---|
| 0092105 | 10/1983 | European Pat. Off. . |
| 0223672 | 5/1987 | European Pat. Off. . |
| 0288127 | 10/1988 | European Pat. Off. . |

Primary Examiner—Kenneth R. Rice
Attorney, Agent, or Firm—Kanesaka and Takeuchi

[57] ABSTRACT

A shoulder belt adjusting apparatus of a seat belt in which a belt anchor in which the shoulder belt is loosely inserted is slidably supported and the position of the belt anchor is vertically adjustable comprising an anchor supporting member supporting the belt anchor, guide rails slidably holding the anchor supporting member, a screw shaft disposed vertically along the guide rails, and a moving member which is screwed to the screw shaft and moves along the guide rails together with the anchor supporting member in accordance with the rotation of the screw shaft with its part loosely put in the anchor supporting member, characterized in that both ends of the screw shaft are rotatably attached to the guide rails and the screw shaft is suspendedly supported by the guide rails at its upper end.

7 Claims, 6 Drawing Sheets

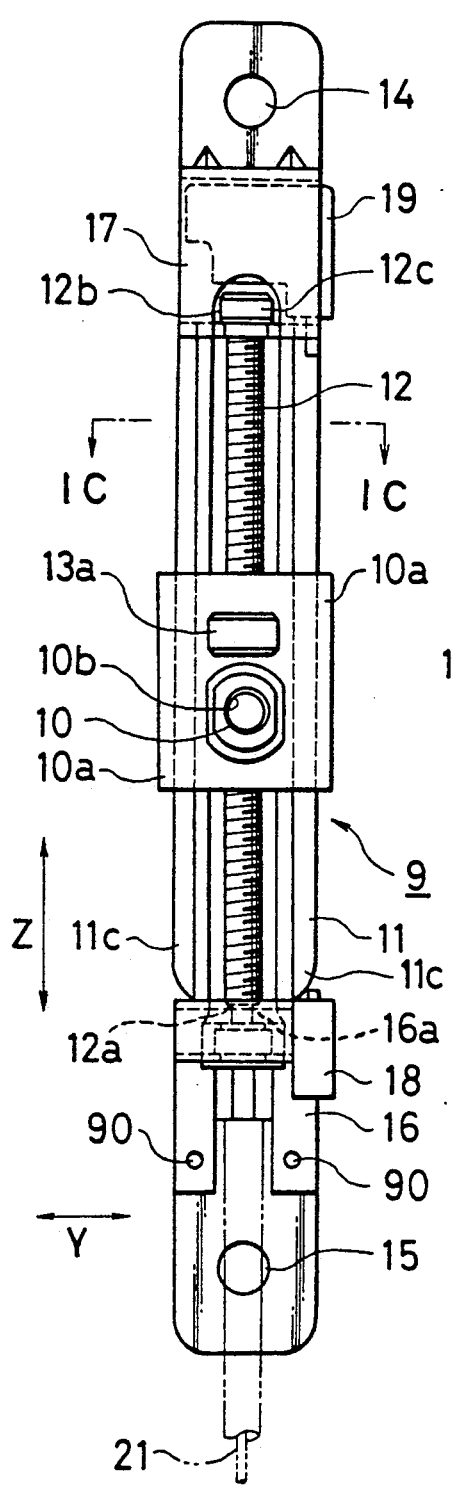
FIG.IA
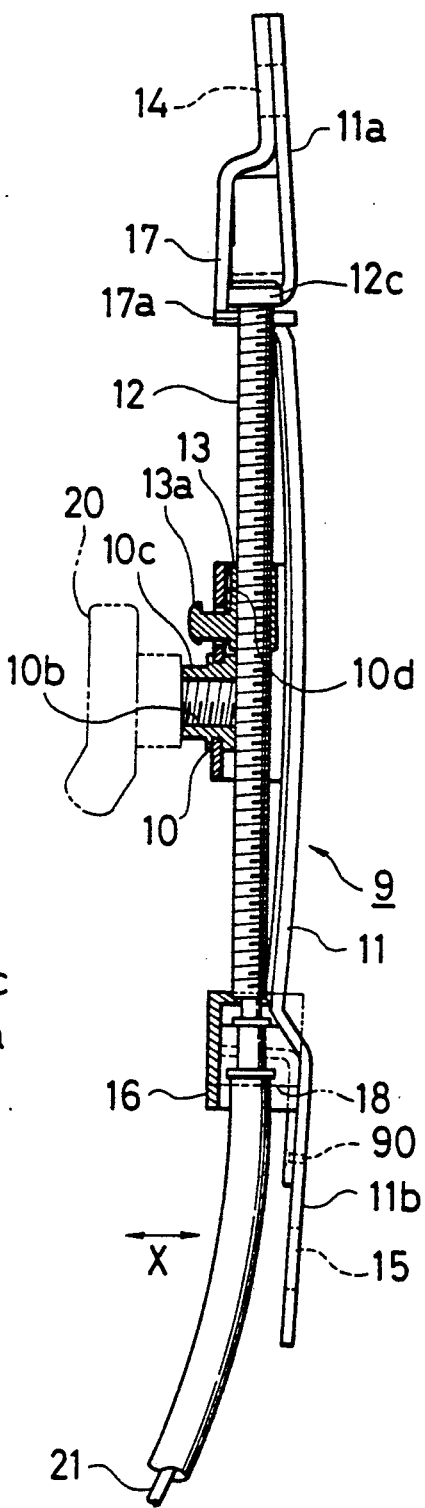
FIG.IB
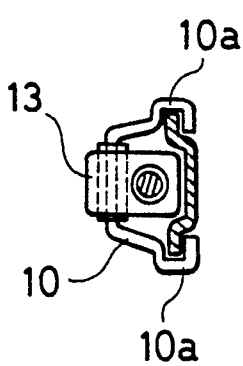
FIG.IC

FIG.4A
FIG.4B
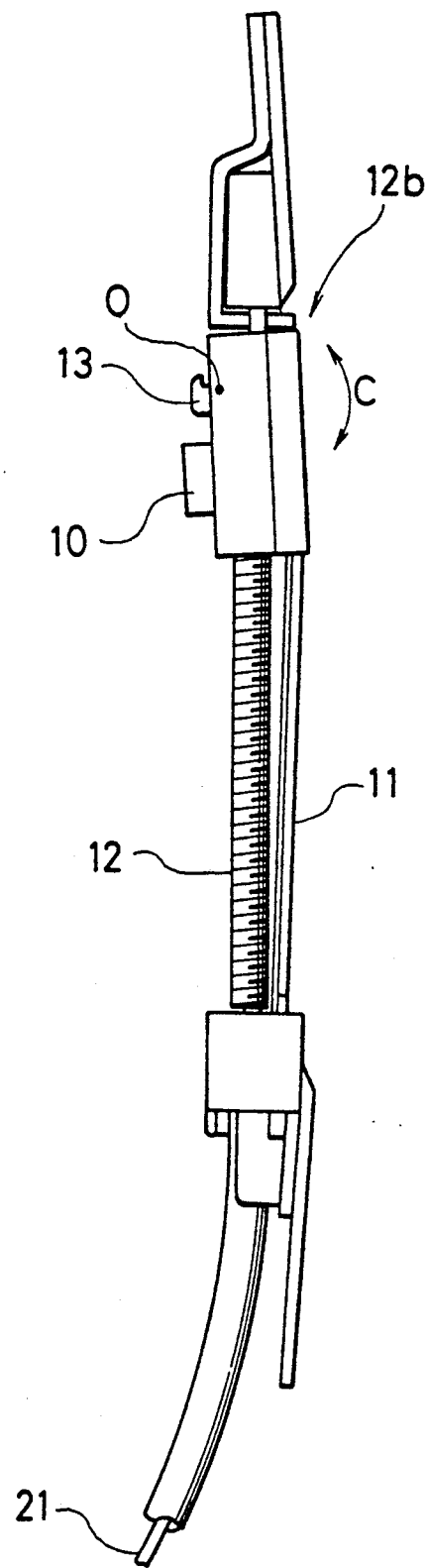
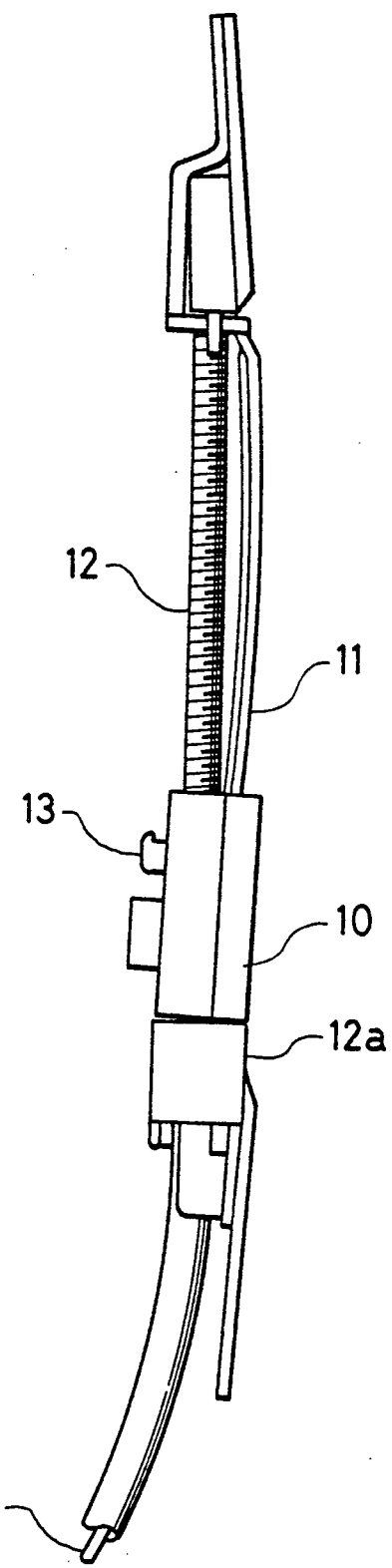

SHOULDER BELT ADJUSTING APPARATUS OF A SEAT BELT

FIELD OF THE INVENTION AND RELATED ART STATEMENT

The present invention relates to a seat belt apparatus used for protective binding of an occupant who sits on a seat of an automobile, etc., and more particularly, to a shoulder belt adjusting apparatus of a seat belt.

An is generally automobile, provided with a seat belt which protects an occupant inside by binding him to his seat in an emergency such as a collision.

When a body of an occupant in the automobile, etc. is bound by a seat belt like this, in order to withstand a momentary load several tens times as much as his own weight, the portions of his body which are bound should be of enough strength. Therefore, normally, it is preferable that a lap belt covers his hipbone without fail and a shoulder belt is located between one of his shoulder joints and his neck.

However, people who should be bound is greatly different in individual size and further, position of the seat is different individually.

Accordingly, in order to deal with a problem of this kind, a shoulder belt adjusting apparatus of a seat belt has been conventionally proposed in which individually preferable binding condition for each person can be obtained by adjusting the position of a belt anchor of a shoulder belt.

One shown in FIGS. 6A, 6B and 7 is a conventional shoulder belt adjusting apparatus of a seat belt of this kind.

A shoulder belt adjusting apparatus 1 of a seat belt shown in the Figs. comprises an attaching member 2 attached to a center pillar 8 of an automobile, a screw shaft 3 rotatably attached between bent pieces 2a and 2b of the attaching member 2, and an anchor attaching member 4 which moves in the direction of an arrow A by the rotation of the screw shaft 3 in either direction. 5 shown in FIGS. 6A and 6B is an attaching hole to which anchor 6 movably holding an inserted shoulder belt 7 is attached.

In the shoulder belt adjusting apparatus 1 of a seat belt of the abovementioned structure, the anchor attaching member 4 moves along guide pieces 2d of the attaching member 2 in accordance with the rotation of the screw shaft 3.

In an emergency such as a collision, a strong force acts on a shoulder belt. In an conventional apparatus, this force is borne directly by the screw shaft 3 through the anchor 6 and the anchor attaching member 4.

Accordingly, as a result of using the screw shaft 3 which can bear an assumed force of this kind, conventionally, there is a problem that the apparatus 1 can not be miniaturized.

OBJECT AND SUMMARY OF THE INVENTION

An object of the present invention is to provide a miniaturized shoulder belt adjusting apparatus of a seat belt.

Another object of the present invention is to provide a shoulder belt adjusting apparatus of a seat belt which apparatus is miniaturized, and at the same time, can secure safety of an occupant in the automobile even when an unexpected strong force acts on the shoulder belt.

Still another object of the present invention is to provide a shoulder belt adjusting apparatus of a seat belt which can be attached to a center pillar.

In the present invention, the above-mentioned shoulder belt adjusting apparatus of a seat belt comprises an anchor supporting member supporting a belt anchor, a guide rail slidably holding the anchor supporting member, a straight screw shaft disposed vertically along the guide rail, and a moving member which is screwed to the screw shaft and a part of which is fit loosely into the anchor supporting member, and which moves in accordance with the rotation of the screw shaft, wherein both ends of the screw shaft are rotatably attached to the guide rail and suspendedly supported at its upper portion by the guide rail.

In a preferred embodiment of the present invention, is the lower end of attaching end portions of the screw shaft and the guide rail is a fragile structure which is deformed or broken by a force weaker than the breakage strength of the screw shaft.

Also, in a preferred embodiment of the present invention, the guard rail is curved along their attached part.

In the present invention, the horizontal components (in the directions of X and Y) of a force given to the belt anchor through the shoulder belt are borne by the guide rail as a bending load of the guide rail. The vertical component (in the direction of Z) of a force given to the belt anchor through the shoulder belt is borne by the screw shaft as a tensile load of the screw shaft. Accordingly, mechanical strength of each of the members can be set at a low level and thus miniaturization of the apparatus can be attained.

Further, as the screw shaft does not bear bending load, the screw shaft does not break and the reliability of the apparatus as a whole can be improved.

In the present invention, when the horizontal components of a force given to the belt anchor through the shoulder belt exceed the flexural strength of the guide rail and the guide rail is plastically deformed into an arc, the lower end of the screw shaft is released by deformation or breakage of the lower attaching portion of attaching end portions of the screw shaft and the guide rail. Accordingly, the screw shaft does not bear bending load other than the lower end release force and after its lower end is released, the screw shaft bears only the tensile load. By this, even if an extremely strong force is given to the screw shaft, breakage of the screw shaft is avoided and the occupant in the automobile can be protected without fail.

In the present invention, the guide rail can be curvedly formed so as to fit along the surface of a center pillar of an automobile and can be attached to the attaching portion.

BRIEF DESCRIPTION OF THE DRAWINGS

FIG. 1A is a plan view of an adjusting apparatus of a shoulder belt of a seat belt as an embodiment of the present invention, FIG. 1B is a front view, partially in cross-section, of the adjusting apparatus of a shoulder belt of a seat belt, and FIG. 1C is a sectional, view taken on the line 1C—1C of FIG. 1A;

FIGS. 4A and 4B are explanatory views of the operation of the slider and the moving member;

DESCRIPTION OF THE PREFERRED EMBODIMENTS

Figure 2A:
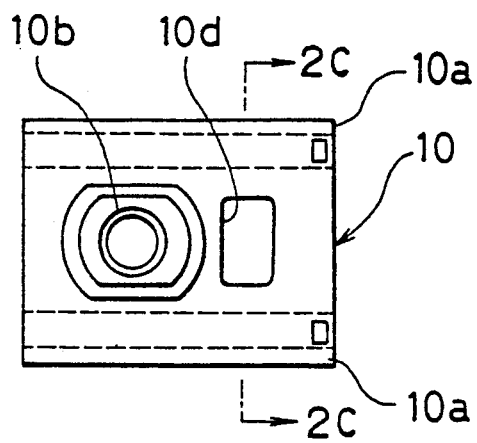
FIG. 2A is a plan view of a slider and FIG. 2B is a sectional view of the slider.

The present invention is hereinafter described referring to the drawings.

FIG. 1A is a plan view of a shoulder belt adjusting apparatus of a seat belt as an embodiment of the present invention. FIG. 1B is a front view of the adjusting apparatus. FIG. 1C is a sectional view taken on the line 1C—1C of FIG. 1A.

A shoulder belt adjusting apparatus 9 of a seat belt shown in the Figs. comprises an anchor supporting member (hereinafter referred to as a slider) 10 supporting a belt anchor 20, a guide rail 11 slidably holding the slider 10, a screw shaft 12 both ends of which are rotatably attached to the guide rail 11 and the upper end of which is suspendedly supported by the guide rail 11, and a moving member 13 which is screwed to the screw shaft 12 and moves along the guide rail 11 together with the slider 10 when the screw shaft 12 is rotated. A part 13a of the moving number 13 is loosely put in the slider 10.

In the above structure, a components shown in the directions of X and Y (horizontal component) of a force given to the belt anchor 20 through a shoulder belt (not shown) is borne by the guide rail 11 and the slider 10, while a component shown in the direction of Z (vertical component) is borne by the screw shaft 12 and the moving member 13. 18 and 19 in the Figs. are detecting switches which detect the positions of the upper and the lower ends of the slider 10.

The guide rail 11 is, in the present embodiment, curvedly formed so as to correspond with the form of a center pillar of an automobile. Bolt through holes 14 and 15 for attaching to the center pillar are bored at ends 11a and 11b, respectively. Guide pieces 11c are formed at the sides of the guide rail 11 between both ends 11a and 11b which hold and slidably guide the slider 10. Attaching 16 and 17 are disposed adjacent to both ends 11a and 11b to which members both ends of the screw shaft 12 are rotatably attached.

The attaching member 16 holds the lower end 12a of the screw shaft 12. The attaching member 16 is formed so that in FIG. 1B it may have an inverted U-shaped. An insert hole 16a in which the lower end 12a of the screw shaft 12 is inserted is formed at one of the two leg portions of the generally inverted U-shaped attaching member 16. The attaching member 16 is fixed to the guide rail 11 by screws 90. When the automobile is in a normal condition, the screws 90 hold firmly enough the screw shaft 12 on the guide rails 11. However, when a strong force in the lateral direction of the screw shaft 12 is given, the screws 90 split under the breakage strength of the screw shaft 12. Thus the lower end 12a of the screw shaft 12 is separated in the direction of an arrow X.

The attaching member 17 holds the upper end 12b of the screw shaft 12, and is of a firm construction with a hole 17a from which the upper end 12b of the screw shaft 12 is suspended. Different from the abovementioned attaching member 16, the attaching member 17 supports the component in the direction of the arrow Z of a force given to the screw shaft 12.

The screw shaft 12 is disposed between the abovementioned attaching members 16 and 17 and generally in parallel to the guide rail 11. A flange portion 12c is formed at the upper end 12b of the screw shaft 12 which is retained by the portion of the attaching member 17 adjacent to the hole 17a. A transmission wire 21 which transmits driving force of a motor (not shown) is attached to the lower end of the screw shaft 12.

Figure 2B:
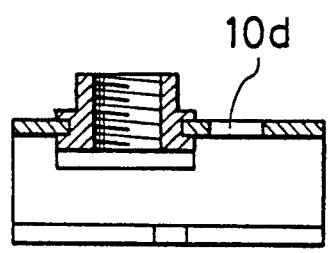
Figure 2C:
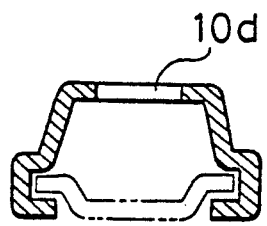
FIG. 2C is a sectional view taken on the line 2C—2C of FIG. 2A.

FIG. 2A is a plan view of the slider 10. FIG. 2B is a sectional view of the slider. FIG. 2C is an end view taken on the line 2C—2C of FIG. 2A.

The slider 10 shown in the Figs. is formed so that its section may be generally U-shaped. Sandwitching portions 10a are formed on both sides of the slider 10 which slidably hold the guide pieces 11c. In the slider 10 an anchor supporting portion 10c is formed to be cylindar-like with a female screw 10b, to which a belt anchor 20 is screwed and a rectangular cutout 10d is formed in which a part 13a of the moving member 13 (detailedly described hereinafter) is loosely put.

Figure 3A:
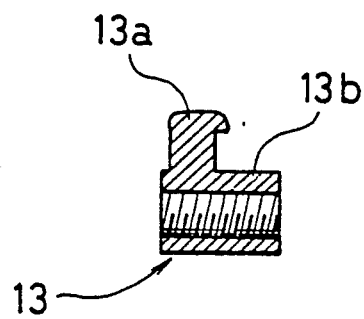
FIG. 3A is a longitudinal sectional view of a moving member and FIG. 3B is a side view of the moving member.
Figure 3B:
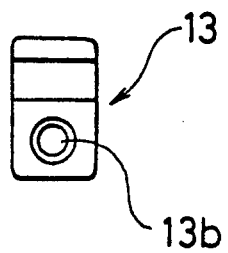
Figure 5:
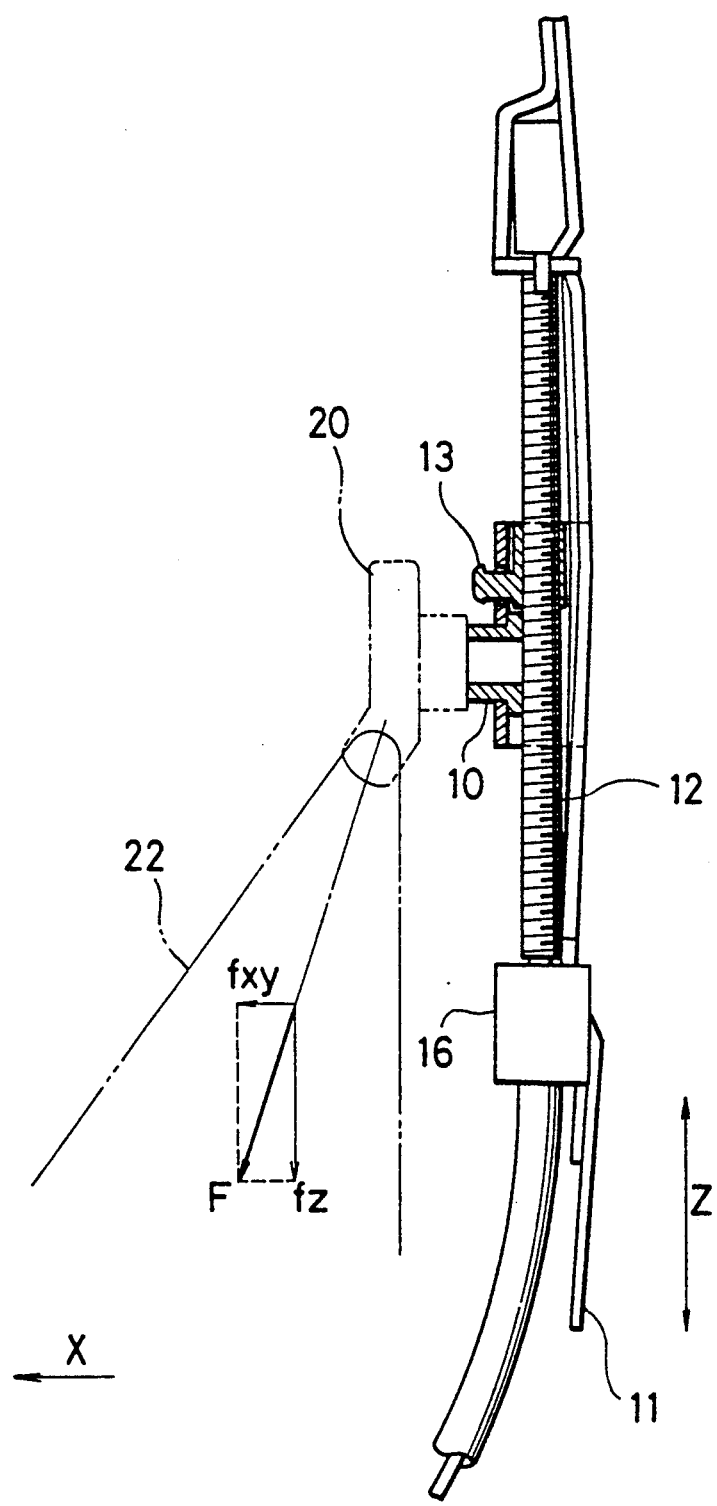
FIG. 5 is an explanatory view of a power given through the shoulder belt.
Figure 6A:
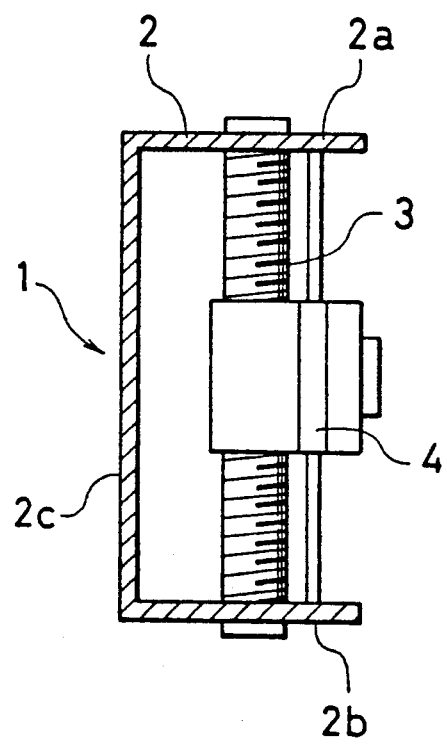
FIG. 6A is a front view of a conventional shoulder belt adjusting apparatus of a seat belt.
Figure 6B:
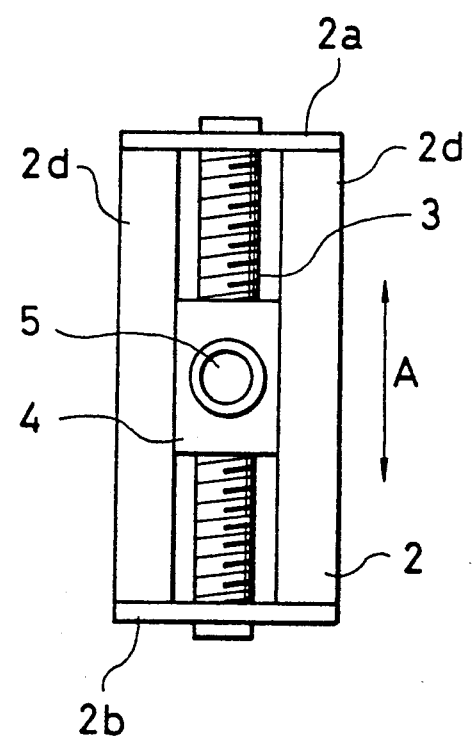
FIG. 6B is a side view of the conventional shoulder belt adjusting apparatus of a seat belt.
Figure 7:
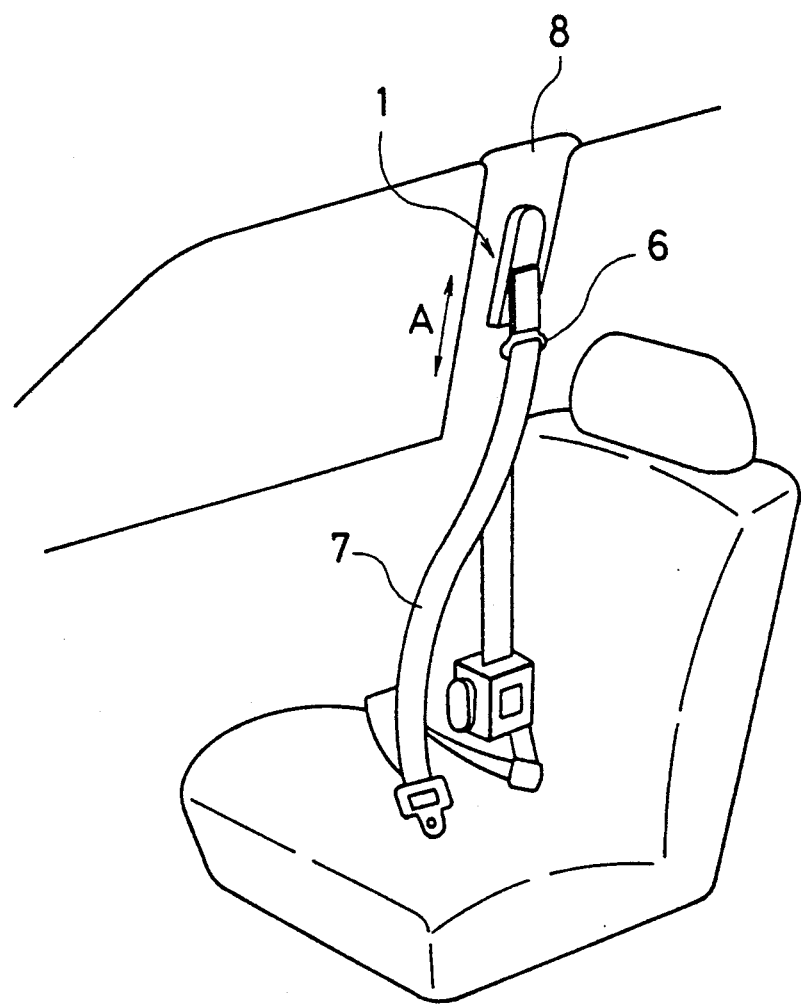
FIG. 7 is an explanatory view of a shoulder belt adjusting apparatus of a seat belt attached to a body of an automobile.

FIG. 3A is a longitudinal sectional view of the moving member 13 and FIG. 3B is a side view of the moving member 13.

The moving member 13 shown in the Figs. comprises a square-pole-like loose inlaid portion (a part of the moving member 13 as abovementioned) 13a and a female screw 13b which is screwed to the screw shaft 12. Depending on the direction of the rotation of the screw shaft 12, the moving member 13 moves along the guide rail 11.

The abovementioned cutout 10d and the loose inlaid portion (a part of the moving member 13 as abovementioned) are loosely engaged to be movably movably, generally in the direction of the arrow X shown in FIG. 1B. While the moving member 13 moves straight along the screw shaft 12, the slider 10 can move along the curved guide rail 11.

Next, the operation and effects of the shoulder belt adjusting apparatus of a seat belt comprising the above elements are described referring mainly to FIGS. 4A and 4B.

FIG. 4A shows a case where the moving member 13 and the slider 10 are on the side of the upper end 12b of the screw shaft 12.

In this case, when the screw shaft is rotated in a predetermined direction by a motor (not shown) through the transmission wire 21, the moving member 13 is moved straight along the screw shaft 12. On the other hand, the slider 10 is moved together with the moving member 13 along the curved guide rails.

When a force acting on the shoulder belt 22 is separated to a component in the direction of Z (vertical component) $f_z$ and a component in the directions of X and Y (horizontal component) $f_{xy}$ which is at right angles to the component $f_z$, the component in the directions of X and Y $f_{xy}$ is borne by the slider 10 and the guide rail 11. As the slider 10 is loosely held by the moving member 13, the component in the directions of X and Y $f_{xy}$ is not borne by the moving member 13 and the screw shaft 12.

As for the direction of the arrow Z, as the slider 10 is only caught in the moving member 13, contrary to the abovementioned, the component in the direction of Z $f_z$ is not borne by the slider 10 and the guide rail 11, and is borne by the moving member 13 and the screw shaft 12 suspendedly supported at its upper end 12b. Accordingly, only tensile stress acts and bending stress does not act on the screw shaft 12. Therefore, a screw shaft of a smaller diameter compared with that of a conventional screw shaft can be used, and still, there is no fear that the screw shaft might be broken. Thus, the present apparatus as a whole can be miniaturized and at the same time, its reliability is improved.

When the abovementioned component in the directions of X and Y $f_{xy}$ is greater than the flexural strength (plastic deformation strength) of the guide rail 11, the guide rail 11 is deformed into an arc according to the component in the directions of X and Y $f_{xy}$ and a bending force acts on the screw shaft 12. In the present embodiment, such a case is assured and the screws fixing the attaching member 16 to the guide rail 11 are made split under the breakage strength of the screw shaft 12 and thus the lower end 12a of the screw shaft 12 is permitted to shift in the direction of the arrow X so as to move away from the guide rail 11, and bending force beyond the breakage strength of the screw shaft does not act on the screw shaft 12. Accordingly, there is no fear that an occupant in the automobile is in non-bound state and the safety of the occupant can be secured.

Further, in the present embodiment, the guide rail 11 can be formed curvedly corresponding to the form of a center pillar so as to be attached to the center pillar, which contributes to a miniaturization. In this case, the slider 10 can also slide smoothly along the guide rail 11.

In the above embodiment, the attaching member 16 is used as the lower attaching end portion for the screw shaft and the guide rail, and the attaching member 16 is of a fragile structure which deforms or breaks under the breakage strength of the screw shaft 12, but this is not the only possibility and the lower end of the screw shaft 12 of itself may be of a fragile structure. In this case, the same effect can be obtained as that of the above embodiment.

What is claimed is:

1. A shoulder belt adjusting apparatus for a seat belt adapted to support a belt anchor for loosely holding a shoulder belt, comprising:
    a guide rail adapted to be attached to a vehicle and having upper and lower portions;
    an anchor supporting member slidably attached to the guide rail to support the belt anchor;
    a screw shaft disposed parallel to the guide rail and having upper and lower ends rotatably attached to the upper and lower portions of the guide rail, said upper end of the screw shaft being supported by and suspended from the upper portion of the guide rail; and
    a moving member screwed to the screw shaft, said moving member being moved along the guide rail when the screw shaft is rotated, said moving member having means for loosely supporting the anchor supporting member in a lateral direction perpendicular to the guide rail so that lateral force applied to the anchor supporting member perpendicular to the guide rail is substantially directly supported by the guide rail without affecting to the screw shaft.

2. A shoulder belt adjusting apparatus according to claim 1, wherein said lower end of the screw shaft is attached to the lower portion of the guide rail so that when lateral force which is greater than a predetermined force and weaker than breaking force of the screw shaft is applied to the screw shaft through the anchor supporting member and the moving member, the lower end of the screw shaft is detached from the lower portion of the guide rail to prevent breakage of the screw shaft.

3. A shoulder belt adjusting apparatus according to claim 1, wherein said guide rail is formed to be curved along a center pillar of an automobile.

4. A shoulder belt adjusting apparatus according to claim 1, wherein said upper portion of the guide rail has a hole, said screw shaft having a flange portion greater than the hole, said screw shaft being located in the hole of the guide rail so that the flange portion of the screw shaft rotatably supports the screw shaft.

5. A shoulder belt adjusting apparatus according to claim 1, further comprising a transmission wire connected to the screw shaft for rotating the screw shaft.

6. A shoulder belt adjusting apparatus according to claim 1, wherein said guide rail includes an attaching member fixed to the lower portion of the guide rail by means of screws, said lower end of the screw shaft being retained by the attaching member, said screws, when lateral force which is greater than a predetermined force and weaker than breaking force of the screw shaft is applied to the screw shaft through the anchor supporting member and the moving member, being disconnected from the guide rail to allow the lower end of the screw shaft to move away therefrom to prevent breakage of the screw shaft.

7. A shoulder belt adjusting apparatus according to claim 1, wherein said anchor supporting member includes a hole, and said means for loosely supporting the anchor supporting member is a projection loosely situated in the hole so that when the screw shaft is rotated, the anchor supporting member is moved along the screw shaft together with the moving member.

* * * * *